United States Patent [19]

Turley et al.

[11] Patent Number: 4,927,717
[45] Date of Patent: May 22, 1990

[54] BIPOLAR METAL/AIR BATTERY

[75] Inventors: Homer L. Turley, Painesville; Marilyn J. Niksa, Concord; Gerald R. Pohto, Mentor; Andrew J. Niksa, Concord, all of Ohio

[73] Assignee: ELTECH Systems Corporation, Boca Raton, Fla.

[21] Appl. No.: 332,086

[22] Filed: Apr. 3, 1989

Related U.S. Application Data

[62] Division of Ser. No. 56,567, Jun. 1, 1987, Pat. No. 4,828,939.

[51] Int. Cl.$^5$ .................... H01M 4/00; H01M 2/14
[52] U.S. Cl. .................... 429/27; 429/38; 429/66; 429/208
[58] Field of Search .................... 429/27, 36-38, 429/66, 208

[56] References Cited

U.S. PATENT DOCUMENTS

| | | | |
|---|---|---|---|
| 3,682,706 | 8/1972 | Yardney et al. | 429/27 |
| 4,091,174 | 5/1978 | Ruch et al. | 429/27 |
| 4,159,367 | 6/1979 | Berchielli et al. | 429/38 |
| 4,246,324 | 1/1981 | de Nora et al. | 429/17 |
| 4,354,958 | 10/1982 | Solomon | 252/425.3 |
| 4,389,466 | 6/1983 | Joy | 429/27 |
| 4,515,672 | 5/1985 | Platek et al. | 204/269 |
| 4,551,399 | 11/1985 | Despic | 429/27 |
| 4,560,626 | 12/1985 | Joy | 429/27 |
| 4,609,595 | 9/1986 | Nickols | 429/36 X |
| 4,687,714 | 8/1987 | Oltman et al. | 429/27 |
| 4,693,946 | 9/1987 | Niksa et al. | 429/208 X |
| 4,714,662 | 12/1987 | Bennett | 429/27 |

FOREIGN PATENT DOCUMENTS

1233127 5/1971 United Kingdom .

Primary Examiner—Stephen J. Kalafut
Attorney, Agent, or Firm—John J. Freer

[57] ABSTRACT

A bipolar battery assembly of the consumable metal anode type is described. Contact between internal battery elements is now enhanced by air assisted, internally exerted compressive force. Battery elements are constructed in modular manner that assists in the ease of battery assembly and disassembly. Furthermore, ease of anode replenishment is maintained. A multitude of individual cells can now be joined together in an efficient bipolar assembly cell stack for augmented electrical energy generation. In addition to being bipolar, the battery is of rugged construction, providing for dependable, long-life operation that is desirably maintenance-free.

11 Claims, 5 Drawing Sheets

BIPOLAR METAL/AIR BATTERY

This is a division of application Ser. No. 056,567, filed June 1, 1987, now U.S. Pat. No. 4,828,939.

BACKGROUND OF THE INVENTION

In batteries using air cathodes and consumable metal anodes, there have been proposed forms into which electrodes can be secured. In U.S. Pat. No. 4,246,324, box-like forms have been used with electrodes that are positioned on opposing faces of the form. Electrolyte is maintained between the facing electrodes and the consumable anode can be of plate shape, secured in the box-like form by spring clips.

In the U.S. Pat. No. 4,091,174 there have been shown rod-shaped consumable electrodes. These can be secured in apertures of similar concentric shape and springs may be useful for maintaining this particularly shaped consumable electrode closely adjacent an air electrode. As shown in the U.K. Patent No. 1,223,127 the air electrode may be separated from the consumable electrode by strips across the face of a plate-like air electrode. Furthermore, these strips may have projections, like tiny nubs, that maintain a spacing between a consumable electrode, which can be in plate-like form and the air electrode. A sequence of these members are taught to be capable of being bound together and then external spring can be wrapped around such bound grouping for maintaining pressure between the internal battery members.

It has been more recently taught in the U.S. Pat. No. 4,693,946, that the air cathode can be provided as a module. The module can have a screen surface reinforcement on the cathode face and such elements are firmly crimped and sealed into a metal frame, thereby providing a module. The cathode can be spaced apart from the consumable anode by a cage which serves as an anode holder. The cage maY be V-shaped, whereby useful anodes are wedge-shaped.

It has also recently been shown in U.S. Pat. No. 4,551,399 that the cathode can be mounted on arms, and the arms wired. The arms can then penetrate through a separator wall and thereby be in contact with an anode on the far side of the wall. The anode may be wedge shaped with the backside conforming with the straight separator wall and the angled side being in a plane parallel to the plane of the cathode.

Ribs running across the face of a cathode, maintaining anode/cathode separation, have also been shown to be useful in the U.S. Pat. No. 4,389,466. On the cathode backside, a porous, rigid support may be used. The porosity of the support permits air to flow through the support element and yet be in contact with the cathode. On the anode side, an expandable bladder is used to maintain pressure on the anode and force it against the ribs to make good electrical contact between ribs and anode. Alternatively, as shown in the more recent U.S. Pat. No. 4,560,626, the bladder can be used in conjunction with coiled springs maintained at the same part of the battery as the bladder. The bladder is again useful for maintaining internal pressure. However, during anode replacement, the internal springs can be useful, against the pressure of the bladder, for retracting the cathode away from the anode so that the anode can be easily replaced.

It is apparent that many desirable features have therefore been investigated in many aspects of the providing a more long life operation to batteries employing consumable electrodes. However, certain combinations of features, packaged in efficient manner, and including a bipolar battery package and therefore of a lighter weight for enhanced energy efficiency would still be highly desirable. Such a cell lending itself to ease of refueling would also be most desirable. Maintenance of pressure operation would be advantageous, as well as prevention of electrolyte spillage.

SUMMARY OF THE INVENTION

An improved and highly efficient metal/air battery has now been constructed. The battery is of bipolar construction, thereby affording lowered weight for enhanced energy output. Moreover, battery volume is desirably reduced while energy efficiency is enhanced. Such bipolar battery can nevertheless be readily refueled. Individual battery cells can be operated under pressure, thereby eliminating problems that could be caused by a change in electrode orientation.

In one broad aspect, the invention relates to a metal-air battery cell adapted for use in a bipolar battery, the cell comprising a consumable, plate-like metal anode, such anode having pressed against a broad face thereof a solid conductive anode current collector, which current collector has, on the side opposite the side pressed against the anode, conductive and compressible members affixed to the anode current collector and extending away therefrom. Furthermore, the cell has a rigid, porous metal member, with the compressible members extending into pressing contact against a broad planar face of such rigid porous metal member, or into contact with an electrically conductive facing element for such member, which member extends, in a direction opposite from the direction of the compressible members, into face-to-face, electrically conductive and air porous contact with, an air cathode which, on its broad planar surface opposite from the porous metal member, is exposed to a chamber that is situated between the air cathode and metal anode, such chamber serving to permit the passage of battery electrolyte between anode and cathode.

In yet another broad aspect, the invention relates to a metal-air battery cell containing conductive compressible members extending from an anode current collector, said compressible members extending to an air porous, electrically conductive, planar reticulate member, as well as extending into pressing contact against a broad face of such reticulate member, and which member has, on the face opposite from the pressing contact, a cathode member for the metal-air battery.

In yet other aspects, the invention relates to a metal-air battery cell containing a special combination anode support. Further aspects include a bipolar battery having special anode current collector assembly and cathode assembly.

DESCRIPTION OF THE PREFERRED EMBODIMENTS

For metal air batteries, electrical energy is released by the dissolution of metal at the anode and reduction of oxygen at the cathode. Since it is the reduction of oxygen that is useful, the use of the word "air" herein is employed for convenience to mean an oxygen source, which understandably can therefore be other than air, e.g., oxygen and other gaseous mixtures including oxygen. Thus by use of the term "air" other serviceable oxygen sources are to be understood. The metals contemplated for dissolution at the anode are aluminum, zinc, lead, calcium, beryllium, lithium and magnesium as well as alloys and intermixtures of same, but aluminum is preferred for economy and efficient electrical generation. Serviceable electrolytes are preferably aqueous, including saline solutions such as seawater, but are most always caustic, e.g., solutions of sodium hydroxide or potassium hydroxide or caustic mixtures containing same.

Figure 1:
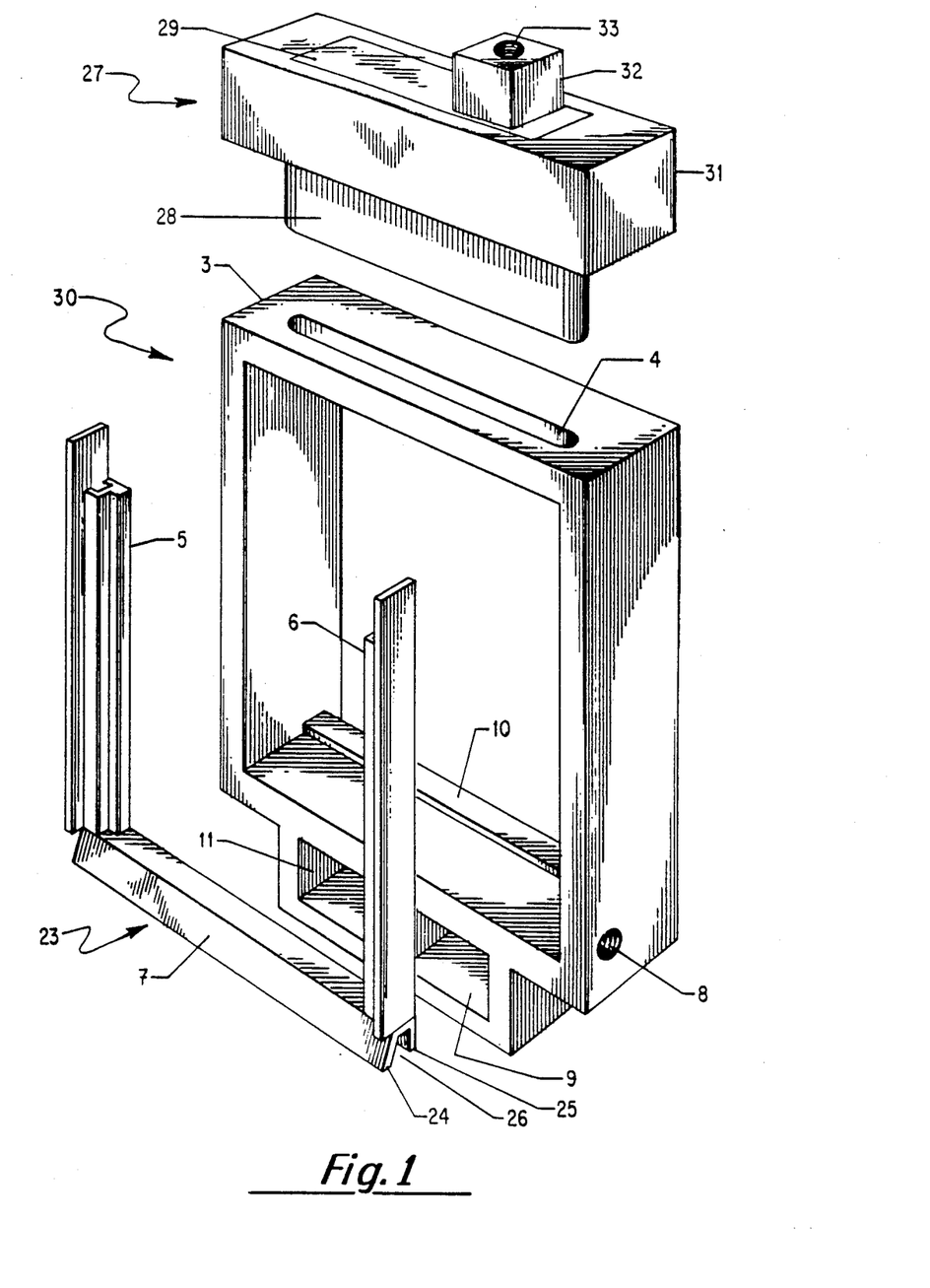
FIG. 1 is an exploded view showing a cell frame including internal anode frame assembly plus anode seal block assembly.

In reference to the drawings, the same identifying number has generally been used for the same element in each of the figures. Referring then to FIG. 1, an anode cell frame assembly shown generally at 30 has a cell frame 3 containing an upper, oblong anode insertion (or removal) aperture 4 through which a metal plate anode, not shown, can be inserted into the cell frame 3. As shown in exploded manner, the cell frame 3 has a U-shaped anode frame assembly shown generally at 23. The anode frame assembly 23 has upright frame rails 5,6. These frame side rails 5,6 are notched to assist in the removal of a spent plate anode, not shown. The plate anode, not shown, therefore is placed between the forward, innermost edges of the rails 5,6 and not within the notches, so that the assembly 23 is not a positive stop for the forward movement of an anode. These upright rails 5,6 are connected at the bottom by a hollow, lower frame member 7. This frame member 7 has depending frame legs 24,25 forming a lower frame member aperture 26 therebetween. The cell frame 3 has a passage extending from an electrolyte inlet 8 for feeding electrolyte into the lower frame member aperture 26. At its lowest part the cell frame 3 has an air inlet plenum 9 and an air discharge plenum 11. When the anode frame assembly 23 is inserted in the cell frame 3 it can be moved forward until the depending frame eg 25 engages a riser 10 inside the frame 3.

Shown in exploded view above the cell frame 3 is an anode seal block assembly 27. This assembly 27 contains a depending tenon 28 sized for snug fit in the anode insertion aperture 4. Above the tenon 28, the anode seal block assembly 27 has a middle insert 29 incorporated in an outer frame block 31. This frame block 31 is sized for attachment to the upper surface of the cell frame 3. Upon removal of the frame block 31 plus the insert 29, the tenon 28 is also removed. At the top of the middle insert 29, is a riser 32 containing an electrolyte outlet 33.

Figure 2:
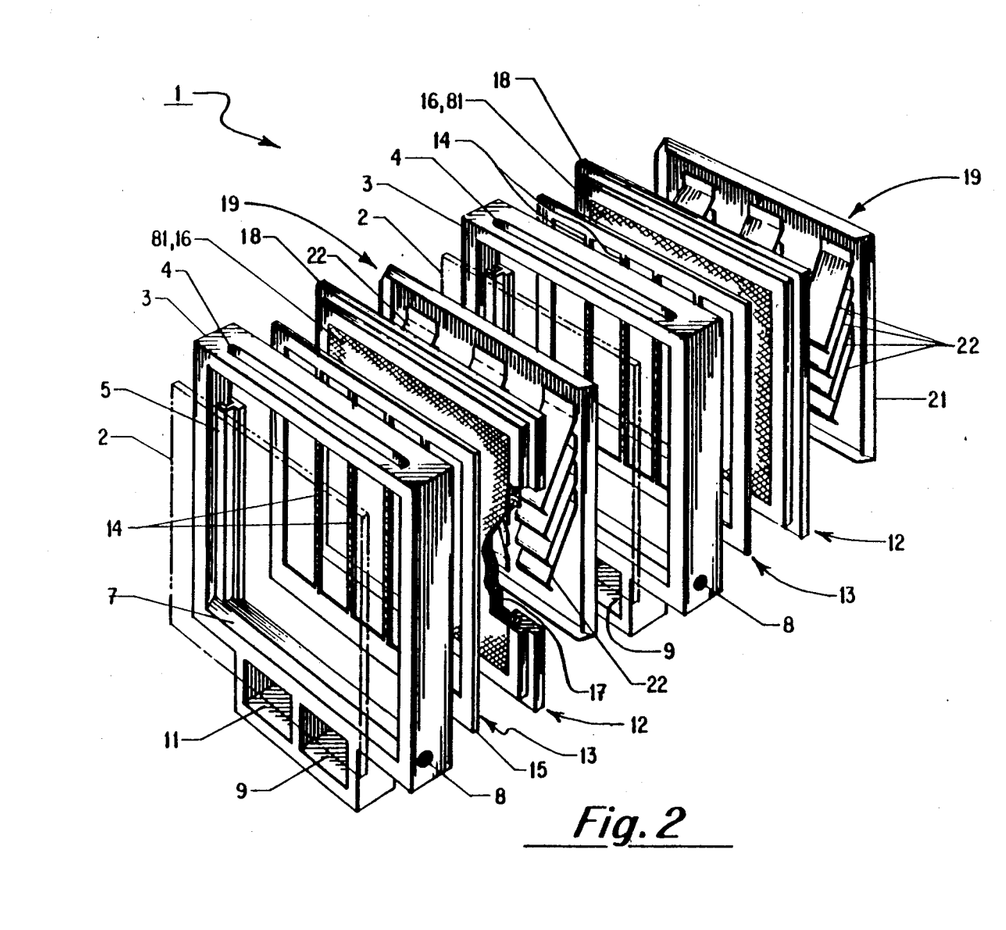
FIG. 2 is an exploded isometric view showing a two cell unit portion of a larger cell stack, including anode and cathode assemblies for each cell unit.

Referring more particularly to FIG. 2, a portion of a cell stack shown generally at 1 has in the near foreground an anode 2, shown in phantom. This metal plate anode 2 is for containment in the cell stack 1 in a cell frame 3, or, more particularly as shown in FIG. 1, in a U-shaped anode frame assembly 23. The anode 2 can be inserted through the insertion aperture 4 into the anode frame assembly 23. This anode frame assembly has notched frame side rails 5 and a lower frame member 7 on which the plate anode 2 rests. The cell frame 3 has an electrolyte inlet 8, an air inlet plenum 9 and an air discharge plenum 11.

On the other side of the cell frame 3 from the metal plate anode 2 is a cathode assembly shown generally at 12 and shown in partial section. A portion of the cathode assembly 12, shown in exploded view in front of an air cathode 16, is a separator assembly 13. This separator assembly 13 is substantially open, e.g., preferably greater than 90 percent open, but has the separator strips 14 contained within a separator frame 15, with the strips providing contact with the plate anode 2. Located behind the separator assembly 13 and positioned in the cathode assembly 12, is an air cathode 16 with cathode screen 81, also referred to as a foraminous metal conductor 81, which air cathode 16 is in the form of a facade fronting on a porous metal member 17. Both the air cathode 16 and its porous metal support member 17 are incorporated in a cathode frame 18. Typically as a whole unit, the separator assembly 13, air cathode 16, cathode frame 18 and support member 17 can be present as a cathode assembly 12.

Behind the cathode assembly 12 is the anode current collector assembly shown generally at 19 comprised of a current collector plate 21 and compressible members 22. For convenience, such members 22 will generally be referred to hereinafter as springs 22. The springs 22 extend from the current collector plate 21 to the porous metal support member 17. The springs 22 thereby create a gap between the plate 21 and support member 17 as well as providing for current flow between the plate 21 and such support member 17.

At its back, the current collector plate 21 is in broad face-to-face contact with a plate-shaped anode 2 for a next, identical cell in the cell stack 1. As for the foregoing described first cell, this next cell has a cell frame 3 containing an anode insertion aperture 4, as well as containing a U-shaped frame. Moreover this second cell has an electrolyte inlet 8, plus air inlet and discharge plenums (9,11). Behind this cell frame 3 of the second cell, the cathode assembly 12 again starts with a separator assembly 13. Within the cathode frame 18, in the foreground, is an air cathode 16. Then behind the cathode assembly 12, for the second cell, is an anode current collector shown generally at 19 and having a collector plate 21 with springs 22. For purposes of convenience, gasketing, which will be more particularly discussed hereinbelow, has been deleted from this FIG. 2.

The support member 17 may be any sufficiently porous, electrically conductive member 17, e.g., a rigid member 17, of little or no deformation under pressure from the springs 22. By being sufficiently porous it is meant that there is suitable porosity, e.g., interconnected pores of a member 17, or openings in a member 17 which may also be sufficiently interconnected for ready access of air to the active surface of the air cathode 16. A porosity of greater than 95 percent can be sufficient for desirable air access, although preferably the support member 17 will have a porosity on the order of 97 to 98 percent or more. By being rigid with little or no deformation it is meant that the internal cell pressure will be sufficiently resisted so that the support member 17 will not puncture or burst the air cathode 16 or allow it to bow away from the anode 2. Thus the facing of the support member 17 may exhibit some slight deformation from spring pressure, which will be acceptable so long as there is no deleterious affect on the air cathode 16. Moreover, the support member 17 may be composed of more than one element, e.g., an open facing element that can be of great rigidity, backed by a more deformable or flexible air porous layer, such as from metal mesh or metal wire, e.g., a metal "wool", or reticulated metal. Suitable air porous, electrically conductive and rigid members 17 are metal members such as metallic grids. These can include punched and perforated metallic sheets as well as honeycomb or mesh or similar structure. Preferably, for enhanced porosity and rigidity, the air porous electrically conductive metal member 17 will be a porous, plate-shaped reticulated rigid metal element such as shown in the U.S. Pat. No. 4,515,672.

Figure 3:
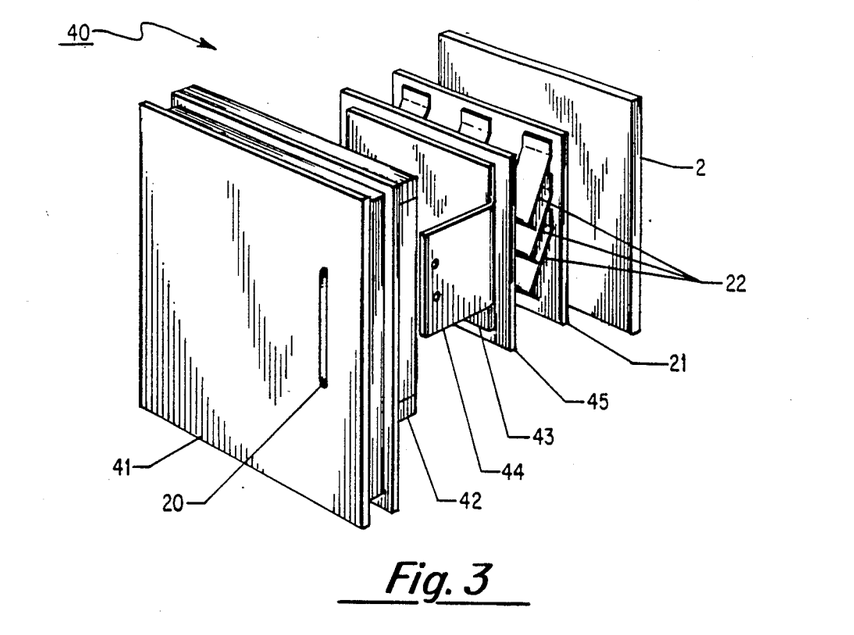
FIG. 3 is an exploded view depicting an anode end assembly for a bipolar battery cell stack.

Referring to FIG. 3, a positive terminal end portion for a battery is shown generally at 40. In the foreground, this end section 40 starts with an anode bulkhead 41. Against the anode bulkhead 41, in air tight engagement, is an air chamber frame 42, containing an air inlet and outlet, rot shown. Adjacent the air chamber frame 42, on the other side of the bulkhead 41, is a positive terminal plate 43. This terminal plate 43 has a flange 44 which extends through a bulkhead slot 20 for electrical connection external to the battery. The terminal plate 43 is in broad face-to-face contact with a conductor plate 45. On the opposite face, the conductor plate 45 is in contact with springs 22 which extend from an anode current collector plate 21. The springs 22 thereby extend across a gap, or chamber, between the conductor plate 45 and the anode current collector plate 21 and, upon cell assembly, are housed in part within the air chamber frame 42. On the broad face of the anode current collector plate 21 opposite the face containing the springs 22, is a metallic plate anode 2.

Figure 4:
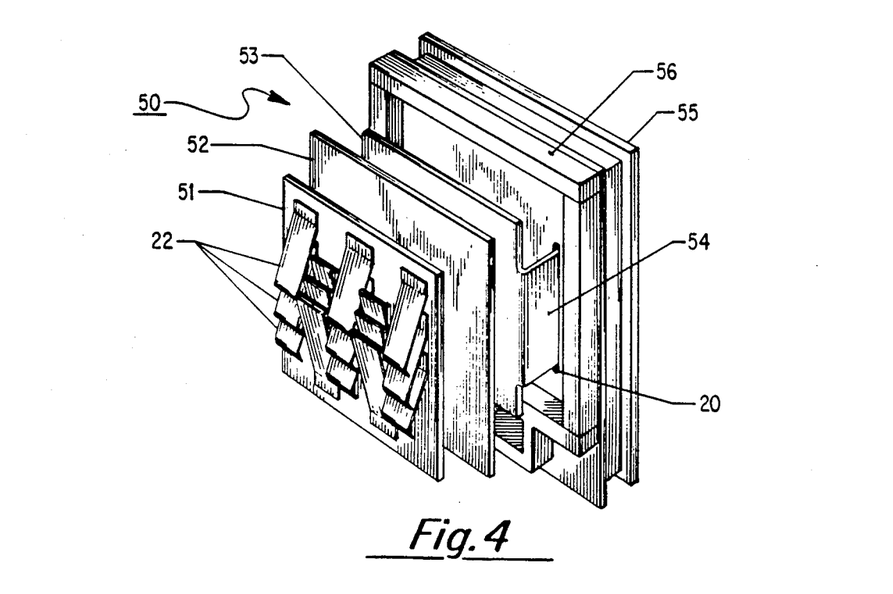
FIG. 4 is an exploded isometric view showing a cathode end assembly for a bipolar battery.

Referring then to FIG. 4, there is depicted a battery negative terminal end section shown generally at 50. In the foreground in FIG. 4, a planar cathode current collector plate 51 has springs 22 extending from its front face. These springs 22 extend from the cathode current collector plate 51 forwardly to a reticulate or foraminous support member for a cathode assembly, not shown. Rearwardly of the springs 22, a broad face of the cathode current collector plate 51 is in planar contact with a broad face of a negative terminal plate 53. Optionally, the intermediate conductor plate 52 may be used. The negative terminal plate 53 has a flange 54 that extends through a bulkhead slot 20 in a cathode bulkhead 55 for electrical connection external to the battery. Beyond the conductor plate 52, is an air chamber frame 56. This frame 56 is then in air tight engagement against the cathode bulkhead 55.

Figures 5, 5A, 5B:
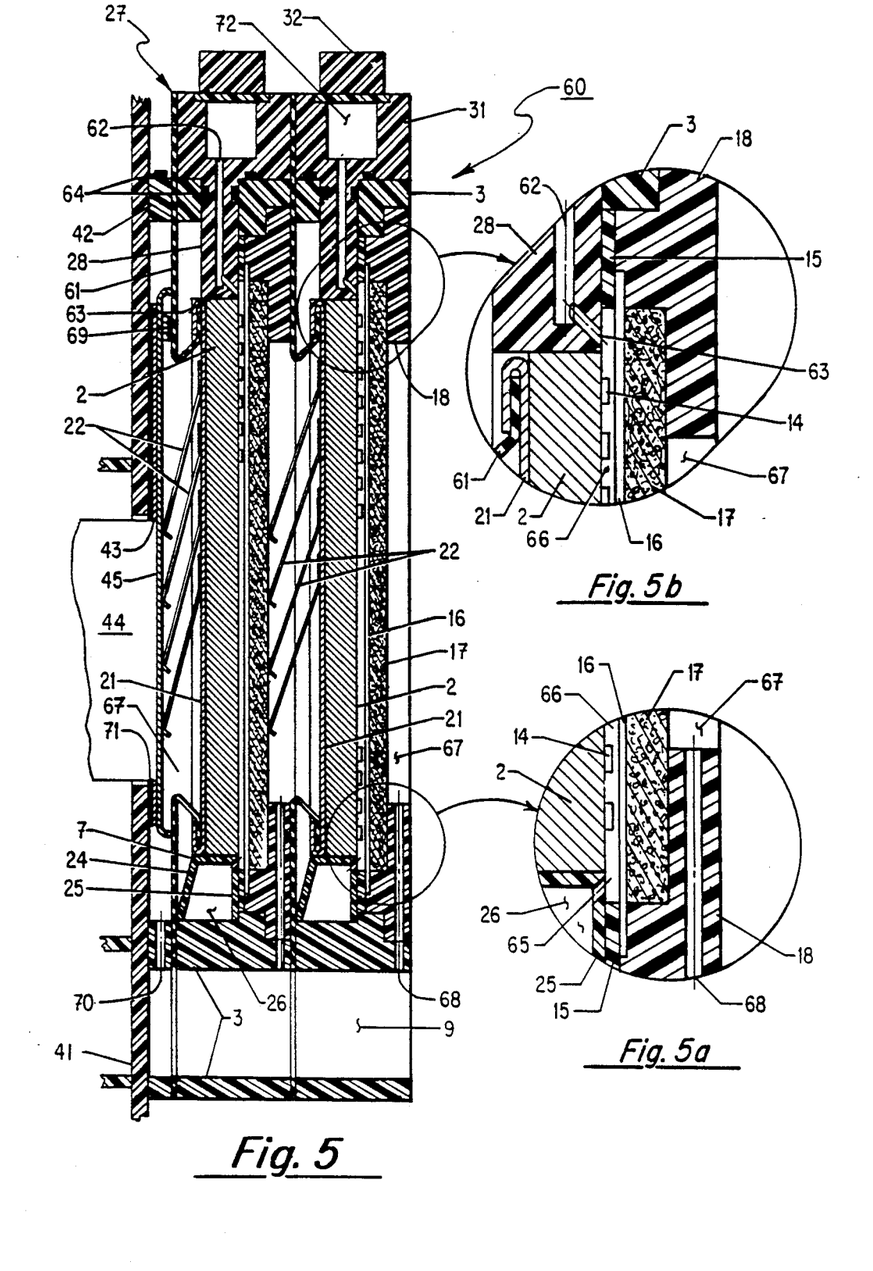
FIG. 5 is a side elevational view of a cell stack depicting two side-by-side bipolar cell units.
FIGS. 5A and 5B are magnified views of inlet and outlet sections of a bipolar cell of FIG. 5.

In FIG. 5, there is depicted in side elevational view a cell stack shown generally at 60 of two unit cells. On the left hand side of the figure, conductor plate 45 for an anode terminal is in contact with springs 22. This conductor plate 45 extends forwardly at its periphery for rigidity. On the opposite side from the springs 22 the conductor plate 45 is in face-to-face contact with a positive terminal plate 43 which has a flange 44 extending through a bulkhead 41. The gasket 71 is positioned around the perimeter of the positive terminal plate 43. As a frame around the conductor plate 45, positive terminal plate 43 and gasket 71 is an air chamber frame 42. This frame 42 is interposed between the bulkhead 41 and diaphragm 61. The conductor plate 45, positive terminal plate 43 and gasket 71 are secured to the bulkhead 41 with an assembly bolt 69. For purposes of clarity, there has been deleted from FIG. 5 gasketing other than gasket 71, although such will be discussed hereinbelow.

The springs 22 are attached to an anode current collector plate 21 and extend across an air chamber 67 to the conductor plate 45. At its periphery, this anode current collector plate 21 is crimped around the axially flexible diaphragm 61. This diaphragm 61 extends completely around the periphery of the anode current collector plate 21. At the end of the diaphragm 61 away from the plate 21, the diaphragm 61 is pinned between an outer portion of the cell frame 3 and the air chamber frame 42. By being axially flexible, it is meant that the diaphragm 61 permits movement within the cell stack 60 in the direction through the cell transverse to the plane of the anode 2.

On the other side of the anode current collector plate 21 from the springs 22 is the anode 2. Atop the anode 2 is the tenon 28 of an anode seal block assembly 27. The tenon 28 depends from the frame block 31 of the seal block assembly 27. The tenon 28 contains an electrolyte exit conduit 62 and a lower electrolyte connector 63 for the egress of electrolyte to an electrolyte compartment 72 contained within the anode seal block assembly 27. The electrolyte flows from the compartment 72 through an electrolyte outlet, not shown, contained in riser 32. The tenon 28 and frame block 31 are sealed against the cell frame 3 by means of 0-ring seals 64.

At the bottom of the anode 2, the anode 2 rests upon a lower frame member 7. This lower frame member 7 has depending frame legs 24,25, which, together with a lower portion of the cell frame 3 provide a lower frame member aperture 26. The aperture 26 connects through a lower frame member outlet 65 (shown in FIG. 5a) to an electrolyte chamber 66. The electrolyte chamber 66 contains the separator 14 (shown in part). The electrolyte chamber 66 provides electrolyte between the anode 2 and air cathode 16. On the side of the air cathode 16 opposite the electrolyte chamber 66 is the porous metal support member 17. This support member 17 is then in compressive contact with a set of springs 22 for the next cell unit. These springs 22, plus the porous metal support member 17, form an air chamber 67 which is thus effectively located in between the air cathode 16, on the one side, and an anode current collector plate 21 on the opposite side.

In the lower portion of the cell frame 3, there is an air inlet plenum 9. At a top face of this plenum 9 for each cell stack an air inlet conduit 68 is provided between the air inlet plenum 9 and the air chamber 67, as well as an air chamber frame air inlet conduit 70 from the plenum 9 through the air chamber frame 42. At the righthand portion of the FIG., there can then be placed, for example, a third cell unit, not shown, or a cathode end assembly as illustrated in FIG. 4.

In FIG. 5a there is shown in greater detail the feed of air and electrolyte to an individual bipolar cell. Referring to the FIG., a portion of a lower frame member aperture 26 is shown connected by means of the lower frame member outlet 65 to the electrolyte chamber 66. This electrolyte chamber 66 is spaced between an anode 2 and an air cathode 16. Within the electrolyte chamber 66 the separator 14 is pressed against the anode 2. At the base of the electrolyte chamber 66 the separator frame 15 is positioned between the anode lower frame member depending leg 25 and the cathode frame 18 plus air cathode 16. Adjacent the air cathode 16 is the porous metal support member 17 housed at its periphery in the cathode frame 18. Penetrating through the cathode frame 18 from an air inlet plenum, not shown, is the air inlet conduit 68 which empties into the air chamber 67.

Referring then to FIG. 5b, the air chamber 67, at its upper portion, is terminated by the upper portion of the cathode frame 18. This cathode frame 18 holds the porous metal support member 17 and also has inserted therein the air cathode 16. Adjacent the air cathode 16 is the electrolyte chamber 66. This electrolyte chamber 66 is contained between an anode 2 and the air cathode 16 and contains the separator 14 which maintains a gap between the anode 2 and the air cathode 16 for free flow of electrolyte in the electrolyte chamber 66. Pressing against the anode 2 on the side opposite the electrolyte chamber 66 there can be seen the top portion of the anode current collector plate 21 which top portion is crimped around an end section of the axially flexible diaphragm 61. At its upper portion, the electrolyte chamber 66 connects through the lower electrolyte connector 63 to the electrolyte exit conduit 62. This combination of connector 63 and conduit 62 are contained within the tenon 28. Adjacent the tenon 28 at the top of the electrolyte chamber 66 is the separator frame 15. Atop the separator frame 15, between the tenon 28 and the cathode frame 18, is a portion of the cell frame 3.

Figure 6:
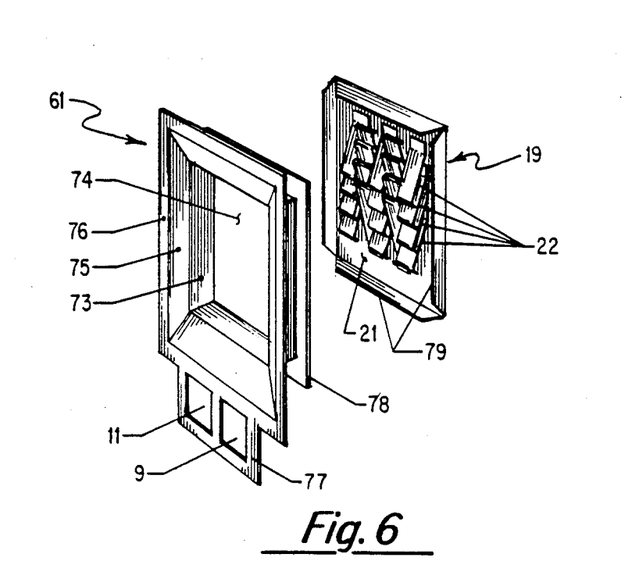
FIG. 6 is an exploded, isometric view of a plate-like current collector with flexible, peripheral diaphragm.

Referring to FIG. 6 there is depicted an axially flexible diaphragm, shown generally at 61, and an associated anode current collector assembly 19. The diaphragm 61 has a frame 73 providing a frame aperture 74 sized at least substantially to the size of a current collector plate 21. Extending frontwardly from the frame 73, at an angle, is an angled edge segment 75, or "first segment" 75, that terminates in a continuous, vertical front edge 76, or "second segment" 76. Thus the angled first segment 75 plus vertical front second segment 76 combine to provide a raised and segmented edge element fronting the frame member 73. The vertical front edge 76 contains a lower apertured section 77 depending from the front edge 76 and having air inlet 9 and air outlet 11 channels. Rearwardly of the frame 73 is a projecting rear edge 78, or first raised edge 78, that extends vertically from the frame 73. The anode current collector assembly 19 associated with the diaphragm 61 has plate edge projections 79 that extend from the current collector plate 21 and can be clamped around the projecting rear edge 78 of the diaphragm 61. In clamped position, the facing of the first raised edge 78 is flush with the current collector plate 21 and the springs 22 on the current collector plate 21 extend through the aperture 74 of the frame 73.

Figure 7:
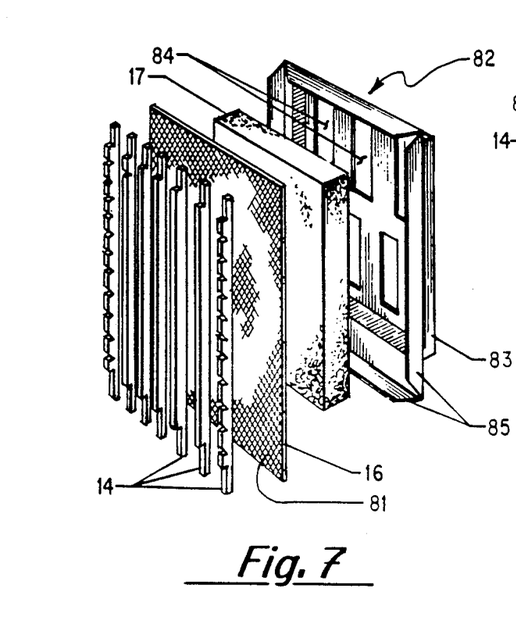
FIG. 7 is an exploded isometric view of a pan cathode variation for the bipolar battery.
Figure 7A:
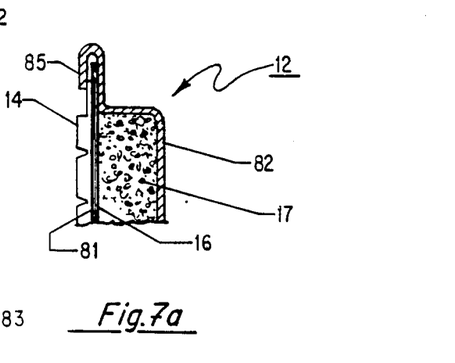
FIG. 7a is a side elevational view, in partial section, of the pan cathode variant of FIG. 7.

Referring to FIG. 7 there is shown an alternative, encased form of air cathode structure. More particularly, an air cathode 16 has a foraminous metal conductor 81 on a broad face of the cathode 16. For engagement against the foraminous metal conductor 81, a separator 14 is provided. Opposite the separator 14, the air cathode 16 engages a porous metal support member 17. This support member 17, air cathode 16 and, optionally, separator 14 can be housed in a cathode current collector pan 82. More particularly, this pan 82 has an apertured housing 83 for containing the porous metal support member 17. The apertures 84 in the facing of the housing 83 permit air passage to the porous metal support member 17. Then the air cathode 16 can be engaged against the support member 17 and held firmly in place by clamping down the pan edges 85 of the pan 82. As an option, the separator 14 may also be clamped in place under these pan edges 85. In FIG. 7a, the clamped cathode assembly 12 made up of separator 14, air cathode 16, having foraminous metal conductor 81, and porous metal support member 17 is depicted. In this assembly 12, the pan 82 has pan edges 85 clamped around the separator 14 and cathode 16. For this construction, springs 22 of an anode current collector assembly 19, all not shown, can extend from a current collector plate, also not shown, for engagement with the housing 83, or with the porous metal support member 17 through the apertures of the housing 83, or for engagement with both. However such housing 83 and support member 17 will be in snug, electrically conductive engagement.

It will be appreciated by reference to the drawings, that the springs 22 provide the major compressive force but that this force can be air assisted by a positive air pressure within the air chamber 67. This compressive force maintains a constant anode-to-cathode gap. By permitting free movement for the anode 2 and the anode current collector assembly 19, the springs 22 compress the anode 2 against the separator 14, the separator 14 thereby providing a positive stop for the anode 2 movement in the direction of the air cathode 16. The separator 14 likewise maintains the constant anode-to-cathode gap. Moreover, the air assisted, spring loaded compressive force maintains the internal electrical connections for the bipolar cell. This bipolar joint is maintained from cell to adjacent cell, as in a cell stack assembly. The internal bipolar joints are of high surface area. They are joints of simply pressure connection without metallurgical bonding. e.g., welding or soldering, and without internal mechanical connections such as from the use of internal threaded fasteners.

For assembling a cell stack, such assembly can be initiated with a pair of opposing bulkheads 41,55. These bulkheads 41,55 can be made of solid material, advantageously a dielectric material, so that bolted metal tie rod connections can be used. It is preferred for economy, that the bulkheads 41,55 be made of a machinable or moldable plastic that is resistant to caustic such as acrylonitrile-butadiene-styrene (ABS) resins or chlorinated polyvinyl chloride (CPVC) resins and including polypropylene, although the use of other materials is contemplated. For the positive end of the cell stack, the positive terminal plate 43 can be preferably copper, which is meant to include copper and its alloys, e.g., beryllium-copper and brass. This copper plate 43 serves for efficient removal of current produced by the battery. Because of the seal that is present, the terminal plate 43 need not be caustic stable and is not electrolyte cooled. Against the copper terminal plate 43 there can be positioned a nickel anode conductor plate 45. This plate 45 can be provided bY nickel or its alloys, e.g., Monel. Other metals contemplated for such conductor plate 45 include stainless steel and plated metals such as nickel plated carbon steel. A gasket 71 can be used to isolate the copper plate 45 from the air chamber 67. For the air chamber frame 42, around the copper plate 43, nickel plate 45 and gasket 71, there can be used materials of construction as for the bulkhead. This air chamber frame may then be glued to the bulkhead or hot air or solvent welded, or simply held in compression by virtue of the bulkheads.

Behind the nickel plate 45 there can be placed a spring loaded anodic current collector assembly 19. Prior to insertion between the bulkheads 41,55, the anode current collector plate 21 of the assembly 19 can have its edges crimped around the edge of an axially flexible diaphragm 61. The portion of the diaphragm 61 extending away from the crimped end can be extended to the exterior of the cell periphery so that the outer edge of this portion can be firmly clamped between outer frame members 3 of the cell. At the crimped section, the diaphragm 61 can be merely held by the mechanically crimped edge of the collector plate 21 or such might be glued or heat sealed or any combination thereof. It can be seen that such axiallY flexible diaphragm 61 seals the air chamber 67 from entry by electrolyte. Such diaphragm 61 can be made from an elastomer made from ethylene-propylene diene monomer (EPDM), neoprene, vinyl or other like material stable in electrolyte. The cell frame 3 can then be inserted between the bulkheads 41,55 and the appropriate air and electrolyte connections made. Suitable materials of construction for the cell frame 3 are those employed for the bulkheads 41,55. Likewise the anode seal block assembly 27 can be of similar materials of construction as for the cell frame 3. It is preferred that the middle insert 29 of the assembly 27 will be firmly in place in the frame block 31, as by gluing or solvent welding the insert 29 to the block 31. Likewise the riser 32 is affixed to the insert 29 or may be machined as one piece with the insert 29. Likewise the tenon 28 and frame block 31 may be machined or formed as a single unit. The seal block assembly 27 can then be secured, as by threaded fasteners or clamps or the like to the cell frame 3.

The porous metal support member 17 and air cathode 16, preferably doubly gridded, can be incorPorated in the cathode frame 18. The separator assembly 13 can be attached against the cathode assembly 12, e.g., by gluing the separator frame 15 to the cathode frame 8. The separator 14 and separator frame 15 may be a single unit. e.g., of molded plastic such as polypropylene, or the separator 14 may be separate and then attached to the frame 15. It will be understood that the separator 14 need provide a great amount of open area between the anode 2 and the air cathode 16, e.g., greater than 90 percent open area and typically about 95 percent open area. Thus the separator 14 can be strips or mesh or other form providing such a suitably great degree of open structure and have thickness sufficient to provide a positive stop between the air cathode 16 and the anode 2. Other suitable materials for the separator assembly 14 include the non-electrically conductive materials of the bulkheads 41,55.

It is preferred that the air cathode 16 be doubly gridded, i.e., have a foraminous metal conductor 81 at both the gas supplying cathode side as well as the liquid or active side. By use of the term "foraminous metal conductor" 81 it is meant to include the metal screens and meshes, such as woven wire meshes and screens of usually fine wire, that can be serviceable for impressing into a broad face of a cathode surface for the air cathode 16. On the broad planar surface of the air cathode 16, opposite the anode 2, this conductor 81, or "cathode screen" 81, therefore serves as a part of the cathode current collector. This is in cooperation with the porous metal support member 17. Thus the support member 17 forms a portion of the cathode current collector by having a great number of points of contact with the conductor 81. Typically, the materials suitable for such cathode screens 81 are silver plated copper wire which may be nickel plated, and preferably are nickel plated but with a silver plate top layer.

The porous metal support member 17 to be rigid and conductive is metallic, and for economy, a nickel support member 17 is preferred. For use as a more flexible support member 17 a nickel wire "wool" can be serviceable. Since the reticulate support member 17 must act to distribute air evenly across the broad planar face of the cathode 16, a porous metal support member 17 of greater than 95 percent porosity and typically 95-98 percent or more porosity is preferred.

For a multi-cell unit, the next cell adjacent to the cell first installed can then be similarly assembled as described hereinabove. That is, a spring loaded anode current collector plate 21 can be positioned in place for the springs to extend across the air chamber 67 and contact the porous metal support member 17 of the first installed cell. If only a single cell unit is needed, or after all cells are installed, following the insertion of the cathode frame 18 plus incorporated elements, e.g., the air cathode 16, the cell can be finished in the manner of FIG. 4. That is, a spring loaded cathode current collector plate 51, usually of all nickel construction, can be inserted and this can back up a nickel conductor plate 52. This conductor plate will then be placed against a copper negative terminal plate 53 which then forms the negative pole at the cathode end. The cathode current collector plate 51, conductor plate 52 and negative terminal end Plate 53 can be housed in an air chamber frame 56, which may be glued to the cathode bulkhead 55 or machined as a single unit of frame 56 plus bulkhead 55.

As has been mentioned hereinbefore, it will be typical to employ gasketing, e.g., the gasket 71, between bulkheads 41,55 and collector plates 45,52. Additionally, gasketing can be used between each cell frame 3 and cathode assembly 12. Usually, each gasket will be shaped as a frame, e.g., have a shape like the separator frame 15. Where such gaskets are used, these will provide tolerance relief and are generally made of EPDM or similar material such as neoprene. Where 0-rings are used, as in the anode seal block assembly, these are typically made of EPDM or other suitable plastic or elastomeric materials or their blends. In addition to the frame members mentioned hereinbefore made from ABS or CPVC or the like, usually in machined form, the anode frame assembly 23 can be of like construction. For the compressible members 22, preferably for best conductivity and economy, these are of a spring nickel or hardened nickel, although other serviceable materials are contemplated, e.g., plated copper such as nickel plated beryllium-copper. These members 22 may be coil springs, horseshoe springs, strip springs or belleville washers or the like.

After assembly for operation, with the seal block assembly 27 removed, an anode 2 can be inserted through the anode insertion aperture 4. The presence of the anode 2 pressing on one planar face against the separator 14 and on the opposite planar face against an anode current collector plate 21, will provide for compression of the springs 22. This compression of the springs 22 will maintain a spring induced compressive force, as well as enhancing a good electrical connection and conductive path between anode 2 and air cathode 16. After insertion of the anode 2, the seal block assembly 27 can be replaced by insertion of the tenon 28 into the anode insertion aperture 4. Replacement of the seal block assembly 27 connects the electrolyte exit conduit 62 and lower electrolyte connector 63 with the electrolyte chamber 66. At the outside of the anode seal block assembly 27, electrolyte withdrawal connections can then be made with the electrolyte outlet 33. After an electrolyte feed conduit has been connected with the electrolyte inlet 8, and electrolyte flow is initiated, the electrolyte will flow through the inlet 8 into the lower frame member aperture 26. From this aperture 26, the electrolyte flow will proceed through the lower frame member outlet 65 into the electrolyte chamber 66. In the chamber 66, the electrolyte then flows past a broad planar face of the anode 2 as well as a broad planar face of the air cathode 16. Used electrolyte then exits the chamber 66 initially through the lower electrolyte connector 63 to the electrolyte exit conduit 62 for exiting the cell through the electrolyte outlet 33.

At the same time, air supply and exit means are provided in connection with the air inlet plenum 9 and air discharge plenum 11. Air flowing into the air inlet plenum 9 feeds through the air inlet conduit 68 of the cathode frame 18 into the air chamber 67. The air sweeping into the air chamber 67 feeds into the porous metal support member 17 and hence into contact with the air cathode 16. Air passing through the air chamber 67 exits through an air outlet conduit. Such outlet conduit, not shown, is present in the cathode frame 18 in the manner of the air inlet conduit 68, but spaced apart therefrom. Air exiting the outlet conduit continues into the air discharge plenum 11.

The air cathode 16 will be of a porous sheet type construction. Useful cathodes include those prepared typically as a carbon/polymeric binder matrix of a lipophobic (e.g., hydrophobic) polymer. Generally, this structure will be a catalyzed carbon matrixed with particles of halocarbon polymer binders. The hydrophobic polymer will generally contribute from about 10 to about 50 weight percent of the matrix. The carbon typically is very finely divided, e.g., particles are within the range of from about 0.01 to about 0.1 micron. The halocarbon polymer binder. i.e , a fluorocarbon polymer, may be combined with other Polymeric materials which also may be finely divided. The carbon in the matrixed material may be activated such as by a platinum catalyst. Such cathodes have been disclosed for example in U.S. Pat. No. 4,354,958 which is incorporated herein by reference for such disclosure. The air cathode 16 will provide a wetproof layer, or gas supplying side, to the porous metal member 17, or to a foraminous metal conductor member 81 plus porous metal member 17. The active material side of the air cathode 17 will thus face the electrolyte chamber 66.

When the cell has been assembled, before the insertion of the anode seal block assembly, a doctor knife or like instrument can be inserted through the aperture at the top of the cell frame and the spring loaded anode current collector plate moved aside. Following this movement, a plate anode can then be inserted into the cell. As the anode is being initially slipped into its proper position, the doctor blade, which has been used in the manner of a shoehorn, is then removed and the anode is pushed on down into its proper position. Before insertion of a fresh anode if a used anode is to be first removed, pincers can be suitable for such operation.

In assembly, as mentioned hereinabove, cell body segments can be brought together by usual external mechanical means, such as tie bolts. No separate, internal fastening of individual elements, e.g., welding or of soldering of the cell frames 3, is thereby necessary. The 0-rings, gaskets and diaphragms 61 can provide liquid tight seals, although other sealing means including molded-in-place gaskets such as silicone caulking could also be used. By the use of means such as tie bolts, interconnected cell elements will be maintained under sufficient pressure to provide for all necessary electrolyte and air seals. The bulkhead-to-bulkhead compressive pressure can be transmitted readily through the cell frames. It is to be understood that a casing could be used in place of bulkheads. Furthermore, although a substantially square cell cross section has been depicted, other sections, e.g., circular, can be useful. Moreover, although the cells have been shown in an upright position, it is to be understood that the cell will be operable in other orientation, e.g., on its side.

The following examples show ways in which the invention has been practiced but should not be construed as limiting the invention. In the examples, all parts are parts by weight unless otherwise specified. In the examples, air is used in cell operation, but it is to be understood that other serviceable substances exist, e.g., more concentrated oxygen, and can be useful in the present invention.

EXAMPLE 1

A test cell unit is assembled having bulkheads made of chlorinated polyvinyl chloride ("CPVC"). For the anode terminal as depicted in FIG. 3, a copper anode terminal plate 43 is used. This copper terminal plate 43 is compressed against a nickel conductor plate 45. For the cathode terminal, as depicted in FIG. 4, the cathode terminal plate 53 made of copper is compressed up against a nickel conductor plate 52. At each terminal a gasket of closed cell foamed EPDM rub ar is used around each terminal plate. For the current collector plates, springs in strip form as shown in the FIGS. and made of spring nickel, are welded to the plate face. The metal spring strips are used in sets of four in alternately ascending and descending manner, as shown in the FIGS..

The cathode assembly has an air cathode manufactured as described in copending U.S. Pat. No. 4,693,946. Each broad face of the cathode is provided with a foraminous, fine mesh screen current collector. Such a double-gridded cathode as also described in the above-mentioned patent application. On the air side face of the cathode, a nickel reticulate is in mechanical contact with the fine mesh screen current collector. The reticulate used is known to have approximately 95–98 percent porosity and has more particularly been described in the U.S. Pat. No. 4,515,672. The mechanical contact for the reticulate against the air cathode screen current collector is maintained by the springs.

On the face opposite the reticulate, the air cathode faces a separator. The open construction of this separator of CPVC, is as shown in the FIGS.. The air cathode and the nickel reticulate are placed inside a cathode frame machined from CPVC and the separator frame is glued against the air cathode frame. The air cathode is sealed within the CPVC frame, around the periphery, with a single component, air-dry, elastomeric non-conductive sealant.

The anode cell frame assembly and interior U-shaped plenum are made of CPVC. The seal block assembly is likewise all of CPVC material.

At the total periphery of each of the spring-bearing current collector plates, the metal plate edges are crimped around a diaphragm of EPDM. In addition to crimping, this connection is further sealed with the above-mentioned elastomeric sealant.

The diaphragm extends outwardly and is pressure compressed within the outer CPVC frame, as shown in the FIGS.. All gasketing used in assembly of the cell parts is of EPDM. A gasket is around each electrode terminal plate. Additionally a gasket is used between each cell frame assembly and separator assembly. Also a gasket is present between each cathode assembly and cell frame.

When the tie bolts connecting the bulkheads are torqued to a firm seal, the internal springs initiate tight compression for the internal parts. During battery operation, this initial spring compression pressure will be assisted by positive air pressure. When the tie bolts have been connected, the resulting assembled cell is then ready for completion of connections, e.g., for air and electrolyte flow as well as for external current flow to and from the battery.

EXAMPLE 2

A rectangular shaped aluminum anode measuring approximately 0.95 by 16.5 by 16.5 centimeters (cm.) is inserted through the anode insertion aperture in the cell of Example 1. The aluminum anode had a nickel plate on the current collector surface. The anode is in firm spring compression contact with the nickel plate of the anode current collector assembly. The spacing between the anode and the air cathode is about two millimeters.

Air, electrolyte and electrical connections to and from the cell are made at the junctions as noted in accordance with the description presented hereinabove for Example 1 and in connection with the FIGS.. The electrolyte used is a 5 molar potassium hydroxide at 60° C and it is introduced at a flow rate of approximately 0.3 gallon per minute. Air at room temperature, and soda lime scrubbed to less than 2 ppm. carbon dioxide, is introduced into the cell at a flow rate fifteen times greater than stoichiometric requirements. Under these operating conditions, this cell provided the following: at a current density of 300 milliamps per square centimeter and a cell voltage of 1.37, a total battery power of 112.1 watts.

We claim:

1. A metal-air battery cell having an anode support comprising:
   an elongated lower frame member of a generally inverted U-shape in cross-section upon which an anode rests when inserted into said anode support, said lower frame member having apertures extending from the chamber defined by said general inverted U-shape upwardly toward said anode along said frame member; and
   a pair of upright, elongated side rails spaced apart, one from the other whereby each extend from an end of said lower frame member, with each side rail providing lateral support for an anode.

2. The anode support of claim 1 further characterized by being snugly housed in a battery cell frame and having said chamber connected to electrolyte supply means.

3. The anode support of claim 1, wherein each of said side rails contains a vertical notch extending the length of said rail and facilitating access to an anode supported by said lower frame member.

4. In a metal-air battery cell for use in a bipolar battery, the improvement comprising an anode current collector assembly containing
   a solid current collector plate member for planar face-to-face contact with a plate-like anode;
   conductive and compressible members affixed to said plate member and extending therefrom directionally away from said anode; and
   a flexible, peripheral diaphragm member in a firm engagement around said current collector plate member but spaced apart from, and out of contact with, said anode, said diaphragm member extending initially away from said plate member in like direction as said conductive and compressible members and then directionally into sealing engagement with a container for said battery.

5. The battery cell of claim 4, wherein said compressible members are metal spring members and said spring members extend to a battery cathode member.

6. The battery cell of claim 4, wherein said compressible members extend across an air chamber to an electrode terminal contact plate of a battery end plate.

7. The battery cell of claim 4, wherein said compressible members extend across an air chamber to a plate-shaped and air porous metal member.

8. The battery cell of claim 4, wherein peripheral edges of said plate member are crimped around adjoining raised edges of said flexible diaphragm member.

9. In a cell having a current collector surrounded by a diaphragm, the improvement comprising an axially flexible diaphragm of
   a frame member having size at least substantially as large as the perimeter of said current collector;
   a first raised edge element positioned rearwardly of said frame member and extending vertically and outwardly from said frame;
   an at least essentially flat front facing on said first raised edge element for face-to-face engagement with at least a portion of a current collector; and
   a second, segmented raised edge element positioned forwardly of said frame member, having a first segment projecting outwardly at an angle from said frame member and then extending to a vertically and outwardly projecting front edge second segment positioned around the periphery of said first segment.

10. The axially flexible diaphragm of claim 9, wherein said front edge second segment has an apertured channel element depending therefrom.

11. The axially flexible diaphragm of claim 9, wherein said first raised edge element is clamped under metal frame edge projections of a current collector.

* * * * *